D. G. CHASE.
Apparatus for the Manufacture of Pipe-Stem Candy.

No. 152,969. Patented July 14, 1874.

Witnesses
E. H. Ober.
C. V. Thayer.

Daniel G. Chase, Inventor
By his Att'ys
Henry W. Williams & Co.

UNITED STATES PATENT OFFICE.

DANIEL G. CHASE, OF SOMERVILLE, MASSACHUSETTS.

IMPROVEMENT IN APPARATUS FOR THE MANUFACTURE OF PIPE-STEM CANDY.

Specification forming part of Letters Patent No. 152,969, dated July 14, 1874; application filed January 10, 1874.

*To all whom it may concern:*

Be it known that I, DANIEL G. CHASE, of Somerville, in the county of Middlesex and State of Massachusetts, have invented a new and valuable Improvement in Machines for Making Pipe-Stem Candy; and I do hereby declare that the following is a full, clear, and exact description, reference being had to the accompanying drawings and to the letters of reference marked thereon.

My invention relates particularly to that portion of the machine which cuts off the ends of the sticks of candy after they have been formed by the rollers, and is described in detail below.

Figure 1:
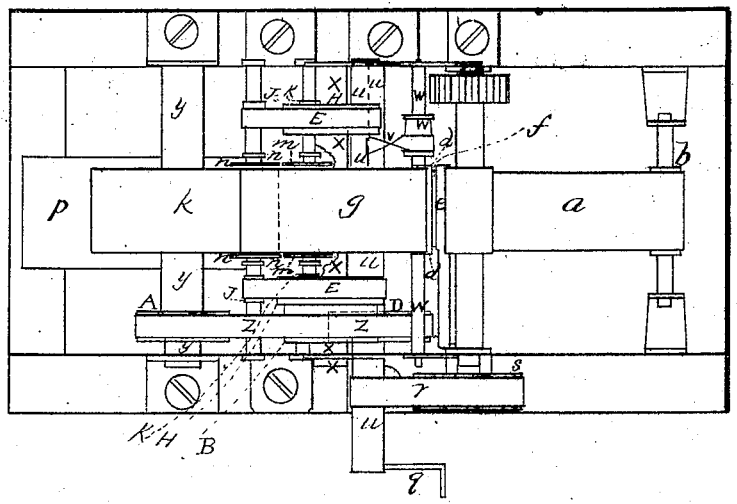
Figure 2:
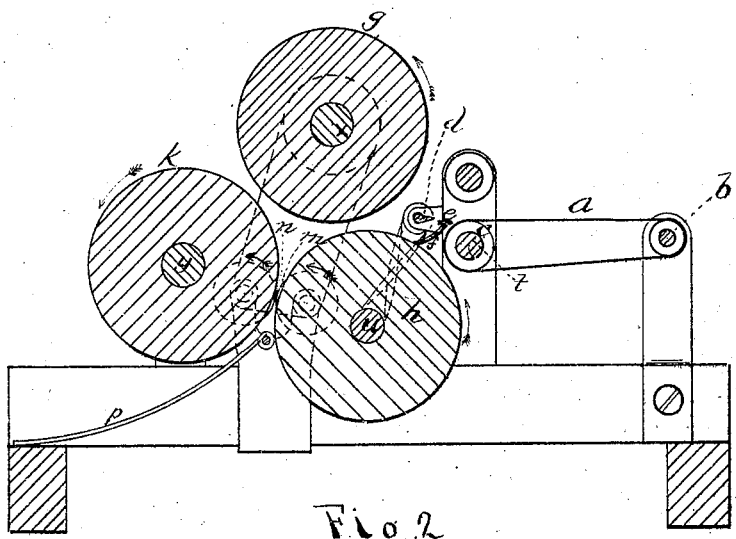

In the accompanying drawings, Figure 1 is a plan of my machine, and Fig. 2 is a longitudinal vertical section of the same. A small portion of a shaft in Fig. 1 is represented as broken out, in order to more clearly and completely show the revolving knives which cut off the ends of the sticks.

Similar letters of reference indicate corresponding parts.

The paste from which the pipe is to be formed is placed upon the band $a$, which, being carried by the rollers $b$ $c$, takes the paste slowly over the shear-plate $e$, where it meets the revolving knife $d$, which, with each revolution, cuts off a strip of proper thickness, which, guided by $f$, drops upon the roll $h$.

Thus far, I claim nothing novel.

In the drawing, the machine is operated by means of a crank, $q$. Of course, in practical operation, proper power will be applied. A band, $r$, passing around the wheel $s$, fixed upon the shaft $t$, operates the roller $c$, and consequently the band $a$ and roller $b$. The revolving knife $d$ is actuated by means of a belt, $v$, passing from the shaft $w$ (of which said knife is a part) to and around the shaft $n$, from which the crank $q$ extends, and upon which the roll $h$ is fixed. $g$ is a roll, fixed upon the shaft $x$. $k$ is a roll, fixed upon its shaft $y$. Motion is communicated to these rolls $g$ $k$ by means of a belt, $z$, which passes over the wheel B, fixed upon the shaft $x$, the wheel A, fixed upon the shaft $y$, and the wheel D, fixed upon the shaft $u$. $n$ $m$ are cutters, a pair being placed upon each side of the machine, and close to the edges of the rolls $h$ $k$. These cutters are rotated in the direction indicated upon the drawing by means of belts E, passing over wheels H (fixed upon the shaft $x$,) and small rollers J K.

Thus it will be seen that the pipe or stick, when it drops from the guide $f$ upon the roll $h$, is rolled over and over by the rolls $g$ and $h$, which revolve in the same direction, until, as the roll $h$ revolves the more swiftly, the pipe is carried between the rolls $h$ and $k$. Of course, it will be understood that the under sides of the rolls $g$ $k$ must move in the opposite direction from that of the upper side of the roll $h$.

There has been much difficulty experienced in producing a smooth, square end. This is fully and perfectly accomplished by the action of the cutters $n$ $m$. Both rotating in the same direction, a good, smooth, clean end is produced, and the pipe drops, completely formed, into the receptacle $p$.

Having thus fully described my invention, what I claim, and desire to secure by Letters Patent, is—

The combination of two or more of the rollers $k$ $h$ $g$ with the cutters $n$ $m$, said rollers and cutters being arranged substantially as shown, and for the purpose hereinbefore set forth.

DANIEL G. CHASE.

Witnesses:
HENRY W. WILLIAMS,
E. H. OBER.